United States Patent
Zmigrod et al.

(10) Patent No.: US 12,437,035 B2
(45) Date of Patent: Oct. 7, 2025

(54) SYSTEM AND METHOD FOR AUTOMATING CONVERSION OF POLICY RULES TO SPREADSHEETS WHILE MAINTAINING DATA SECURITY

(71) Applicant: JPMorgan Chase Bank, N.A., New York, NY (US)

(72) Inventors: Ran Zmigrod, Cambridge (GB); Salwa Husam Alamir, Bournemouth (GB); Raul Rios, Houston, TX (US); Ramkrishna Patil, Newark, NJ (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 263 days.

(21) Appl. No.: 18/227,098

(22) Filed: Jul. 27, 2023

(65) Prior Publication Data

US 2025/0036725 A1    Jan. 30, 2025

(51) Int. Cl.
*G06F 21/14*    (2013.01)
*G06F 40/18*    (2020.01)

(52) U.S. Cl.
CPC .............. *G06F 21/14* (2013.01); *G06F 40/18* (2020.01)

(58) Field of Classification Search
CPC ................................ G06F 21/14; G06F 40/18
USPC .......................................................... 713/190
See application file for complete search history.

(56) References Cited

U.S. PATENT DOCUMENTS

| | | | | |
|---|---|---|---|---|
| 2009/0320093 A1* | 12/2009 | Glazier | ..................... | G06F 8/10 726/1 |
| 2013/0117318 A1* | 5/2013 | Paul | .................. | G06F 16/24564 707/792 |

* cited by examiner

*Primary Examiner* — Michael S McNally
(74) *Attorney, Agent, or Firm* — GREENBLUM AND BERNSTEIN, P.L.C.

(57) ABSTRACT

A method and system for automatically converting a software rule code specifying a policy rule into a human comprehensible document are disclosed. The method includes receiving the software rule code; obfuscating the software rule code prior to submission to a machine learning (ML) model; decomposing the obfuscated software rule code into at least one then block and at least one when block; performing code logic simplification on the at least one then block for separating the at least one then block into at least one logic and at least one action; creating a truth table using the at least one logic; constructing a decision table by combining the truth table, the at least one when block and the at least one action; and outputting the human comprehensible document for display on the display screen.

20 Claims, 7 Drawing Sheets

FIG. 5

Obfuscated Rule

```
rule "xxxInput"
salience 90
when map : Map()
    input1:Class10
    input2:Class20
    input3: Class30
then
    boolean var1 = func4(input2.func2()) && !CONST6(input3.func3());
    map.put(CONST7, new OutputClass(CONST7,var1, true, false, null));
    map.put(CONST8, new OutputClass(CONST8,var1, true, false, null));
    map.put(CONST9, new OutputClass(CONST9,var1, true, false, null));
    map.put(CONST10, new OutputClass(CONST10,var1, true, false, null));
end
```

SYSTEM AND METHOD FOR AUTOMATING CONVERSION OF POLICY RULES TO SPREADSHEETS WHILE MAINTAINING DATA SECURITY

TECHNICAL FIELD

This disclosure generally relates to automatically converting policy rule code into a spreadsheet while maintaining data security during the conversion process. More specifically, the present disclosure is directed to obfuscating data by masking sensitive information before performing the conversion process to maintain data security while providing more access to external technology.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Maintaining policy rules as software codes is a complicated and multi-step process. At the lowest level, policy rules are stored in a code-like format known as Drool rules. These software rule codes are written in Java-like code and as such require a person with technical knowledge or skill, such as a technical developer, to properly understand and maintain. However, such a developer is unlikely to have a deep understanding of the policies and legalities required and requires much communication with another individual who has this knowledge. In practice, this may even be a chain of people, leading to an inefficient and cumbersome process.

SUMMARY

According to an aspect of the present disclosure, a method for automatically converting a software rule code specifying a policy rule into a human comprehensible document is provided. The method includes receiving, by a processor, the software rule code; obfuscating, by the processor, the software rule code prior to submission to a machine learning (ML) model; decomposing, by the processor, the obfuscated software rule code into at least one then block and at least one when block; performing, by the processor, code logic simplification on the at least one then block for separating the at least one then block into at least one logic and at least one action; creating, by the processor, a truth table using the at least one logic; constructing, by the processor, a decision table by combining the truth table, the at least one when block and the at least one action; and outputting, by the processor, the human comprehensible document for display on a display screen.

According to another aspect of the present disclosure, the human comprehensible document is a spreadsheet.

According to another aspect of the present disclosure, the software rule code is a Drool rule.

According to yet another aspect of the present disclosure, the ML model is provided by a third party and resides outside of a cloud network.

According to another aspect of the present disclosure, the ML model is open-source.

According to a further aspect of the present disclosure, the code logic simplification is performed using another ML model.

According to yet another aspect of the present disclosure, the when block includes an input and a precondition.

According to a further aspect of the present disclosure, the truth table includes a plurality of combinations of condition values corresponding to the at least one logic.

According to another aspect of the present disclosure, the truth table lists names of each of the plurality of variables along its columns, and each row of the truth table includes either a true or false value for each of the plurality of variables.

According to a further aspect of the present disclosure, each of the plurality of combinations of condition values corresponds to a specific action that is to be performed.

According to a further aspect of the present disclosure, each of the plurality of combination of condition values corresponds to a specific action, and the specific action is combined with a respective combination of condition values during the constructing of the decision table.

According to a further aspect of the present disclosure, the software rule code includes a rule name, at least one condition and at least one consequence.

According to a further aspect of the present disclosure, the obfuscation of the software rule code includes replacing the rule name with a generic descriptor.

According to a further aspect of the present disclosure, the obfuscation of the software rule code includes replacing the at least one condition with a generic descriptor.

According to a further aspect of the present disclosure, the obfuscation of the software rule code includes replacing the at least one consequence with a generic descriptor.

According to a further aspect of the present disclosure, the obfuscation of the software rule code includes replacing each of the rule name, the at least one condition and the at least one consequence with generic descriptors.

According to a further aspect of the present disclosure, the constructing of the decision table includes replacing the generic descriptors with the rule name, the at least one condition and the at least one consequence.

According to a further aspect of the present disclosure, the human comprehensible document is editable and convertible to a modified or new software rule code executable by the processor.

According to an aspect of the present disclosure, a system for automatically converting a software rule code specifying a policy rule into a human comprehensible document is provided. The system includes a memory, a display and a processor. The system is configured to perform: receiving the software rule code; obfuscating the software rule code prior to submission to a machine learning (ML) model; decomposing the obfuscated software rule code into at least one then block and at least one when block; performing code logic simplification on the at least one then block for separating the at least one then block into at least one logic and at least one action; creating a truth table using the at least one logic; constructing a decision table by combining the truth table, the at least one when block and the at least one action; and outputting the human comprehensible document for display on the display screen.

According to another aspect of the present disclosure, a non-transitory computer readable storage medium that stores a computer program for automatically converting a software rule code specifying a policy rule into a human comprehensible document is provided. The computer program, when executed by a processor, causes a system to perform multiple processes including: receiving the software rule code; obfuscating the software rule code prior to submission to a machine learning (ML) model; decomposing the obfuscated software rule code into at least one then block and at least one when block; performing code logic simplification on the at least one then block for separating the at least one then block into at least one logic and at least one action; creating a truth table using the at least one logic; constructing a decision table by combining the truth table, the at least one when block and the at least one action; and outputting the human comprehensible document for display on the display screen.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 illustrates an obfuscated rule output in accordance with an exemplary embodiment.

DETAILED DESCRIPTION

Figure 1:
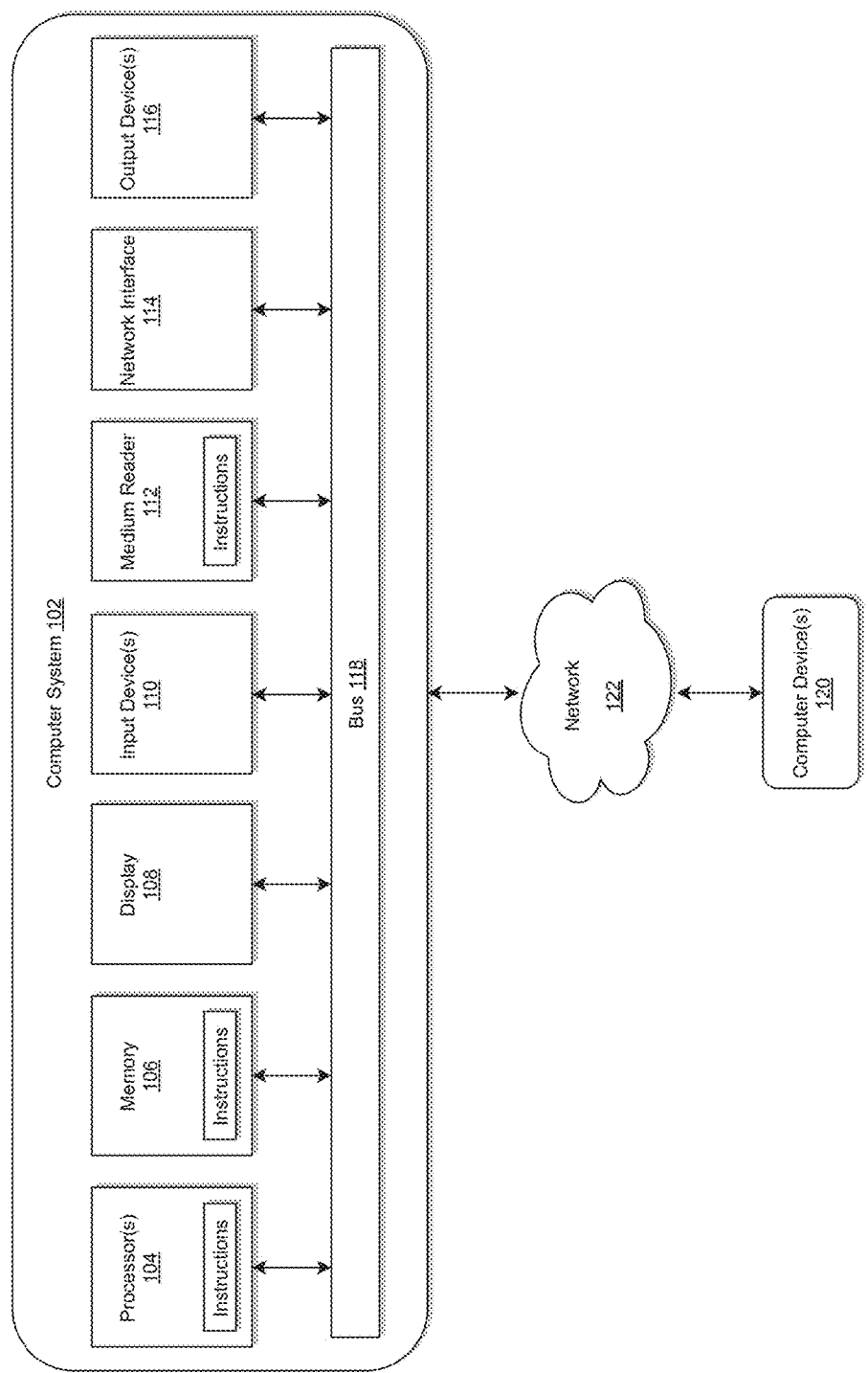
FIG. 1 illustrates a computer system for implementing a rule code conversion system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a rule code conversion system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
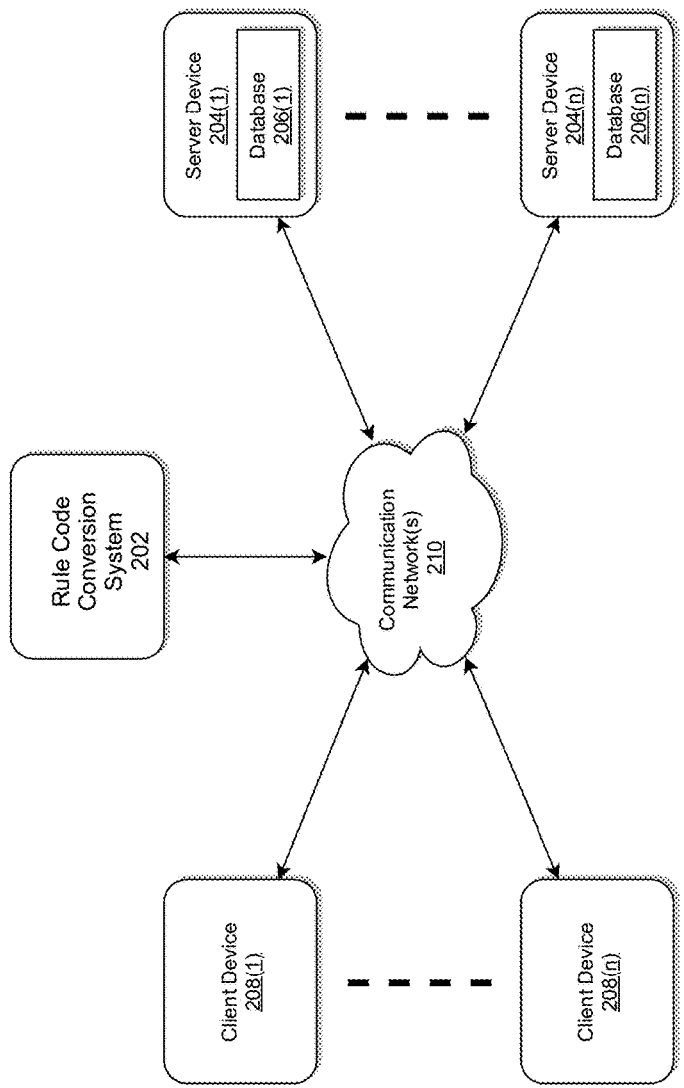
FIG. 2 illustrates an exemplary diagram of a network environment with a rule code conversion system in accordance with an exemplary embodiment.

FIG. 2 illustrates an exemplary diagram of a network environment with a rule code conversion system in accordance with an exemplary embodiment.

A centralized rule system 202 may be implemented with one or more computer systems similar to the computer system 102 as described with respect to FIG. 1.

The centralized rule system 202 may store one or more applications that can include executable instructions that, when executed by the centralized rule system 202, cause the centralized rule system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the centralized rule system 202 itself, may be located in virtual server(s) running in a cloud-based computing environment rather than being tied to one or more specific physical network computing devices. Also, the application(s) may be running in one or more virtual machines (VMs) executing on the centralized rule system 202. Additionally, in one or more embodiments of this technology, virtual machine(s) running on the centralized rule system 202 may be managed or supervised by a hypervisor.

In the network environment 200 of FIG. 2, the centralized rule system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the centralized rule system 202, such as the network interface 114 of the computer system 102 of FIG. 1, operatively couples and communicates between the centralized rule system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the centralized rule system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The centralized rule system 202 may be a standalone device or integrated with one or more other devices or apparatuses, such as one or more of the server devices 204(1)-204(n), for example. In one particular example, the centralized rule system 202 may be hosted by one of the server devices 204(1)-204(n), and other arrangements are also possible. Moreover, one or more of the devices of the centralized rule system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the centralized rule system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the centralized rule system 202 that may efficiently provide a platform for implementing a cloud native centralized rule system module, but the disclosure is not limited thereto.

The client devices 208(1)-208(n) may run interface applications, such as standard web browsers or standalone client applications, which may provide an interface to communicate with the centralized rule system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the centralized rule system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the centralized rule system 202, the server devices 204(1)-204(n), or the client devices 208(1)-208(n), for example, may be configured to operate as virtual instances on the same physical machine. For example, one or more of the centralized rule system 202, the server devices 204(1)-204(n), or the client devices 208(1)-208(n) may operate on the same physical device rather than as separate devices communicating through communication network(s) 210. Additionally, there may be more or fewer centralized rule system 202, server devices 204(1)-204(n), or client devices 208(1)-208(n) than illustrated in FIG. 2. According to exemplary embodiments, the centralized rule system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
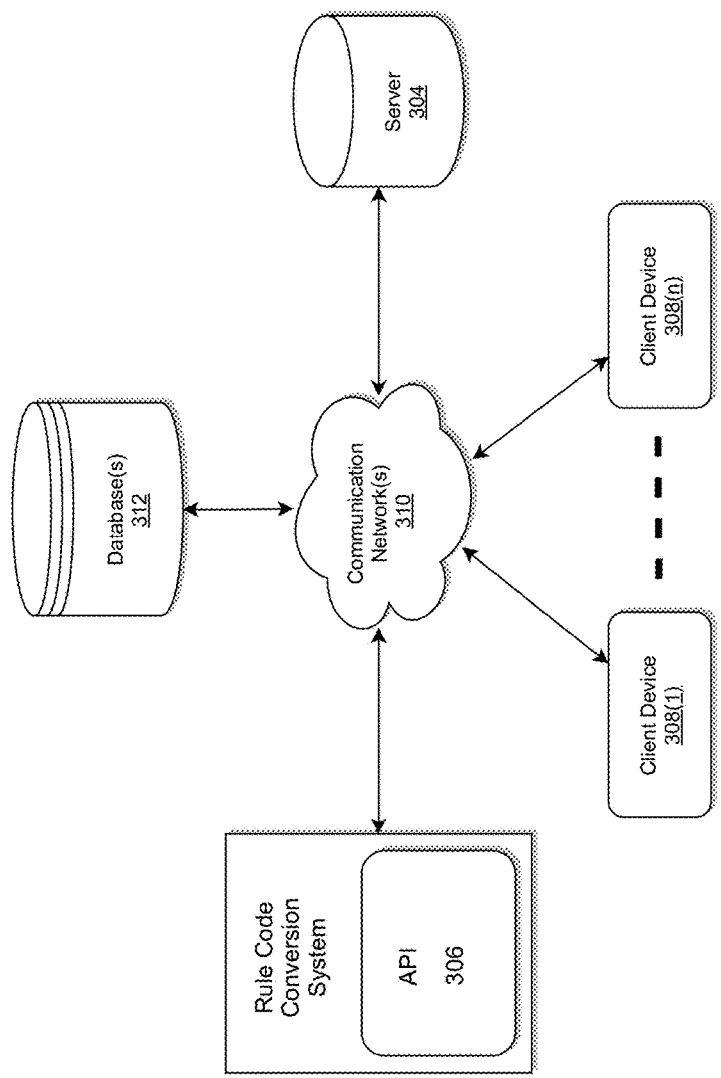
FIG. 3 illustrates a system diagram for implementing a rule code conversion system in accordance with an exemplary embodiment.

FIG. 3 illustrates a system diagram for implementing a rule code conversion system in accordance with an exemplary embodiment.

As illustrated in FIG. 3, the system 300 may include a centralized rule system 302 within which a group of API modules 306 is embedded, a server 304, a database(s) 312, a plurality of client devices 308(1) . . . 308(n), and a communication network 310.

According to exemplary embodiments, the centralized rule system 302 including the API modules 306 may be connected to the server 304, and the database(s) 312 via the communication network 310. Although there is only one database that has been illustrated, the disclosure is not limited thereto. Any number of databases may be utilized. The centralized rule system 302 may also be connected to the plurality of client devices 308(1) . . . 308(n) via the communication network 310, but the disclosure is not limited thereto.

According to exemplary embodiment, the centralized rule system 302 is described and shown in FIG. 3 as including the API modules 306, although it may include other rules, policies, modules, databases, or applications, for example. According to exemplary embodiments, the database(s) 312 may be embedded within the centralized rule system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable centralized rule system as a service for a desired data processing scheme. The UI platform may include an input interface layer and an output interface layer. The input interface layer may request preset input fields to be provided by a user in accordance with a selection of an automation template. The UI platform may receive user input via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the centralized rule system 302. In this regard, the plurality of client devices 308(1) . . . 308(n) may be "clients" of the centralized rule system 302 and are described herein as such. Nevertheless, it is to be known and understood that the plurality of client devices 308(1) . . . 308(n) need not necessarily be "clients" of the centralized rule system 302, or any entity described in association therewith herein. Any additional or alternative relationship may exist between either or both of the plurality of client devices 308(1) . . . 308(n) and the centralized rule system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the centralized rule system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The centralized rule system 302 may be the same or similar to the centralized rule system 202 as described with respect to FIG. 2, including any features or combination of features described with respect thereto.

Figure 4:
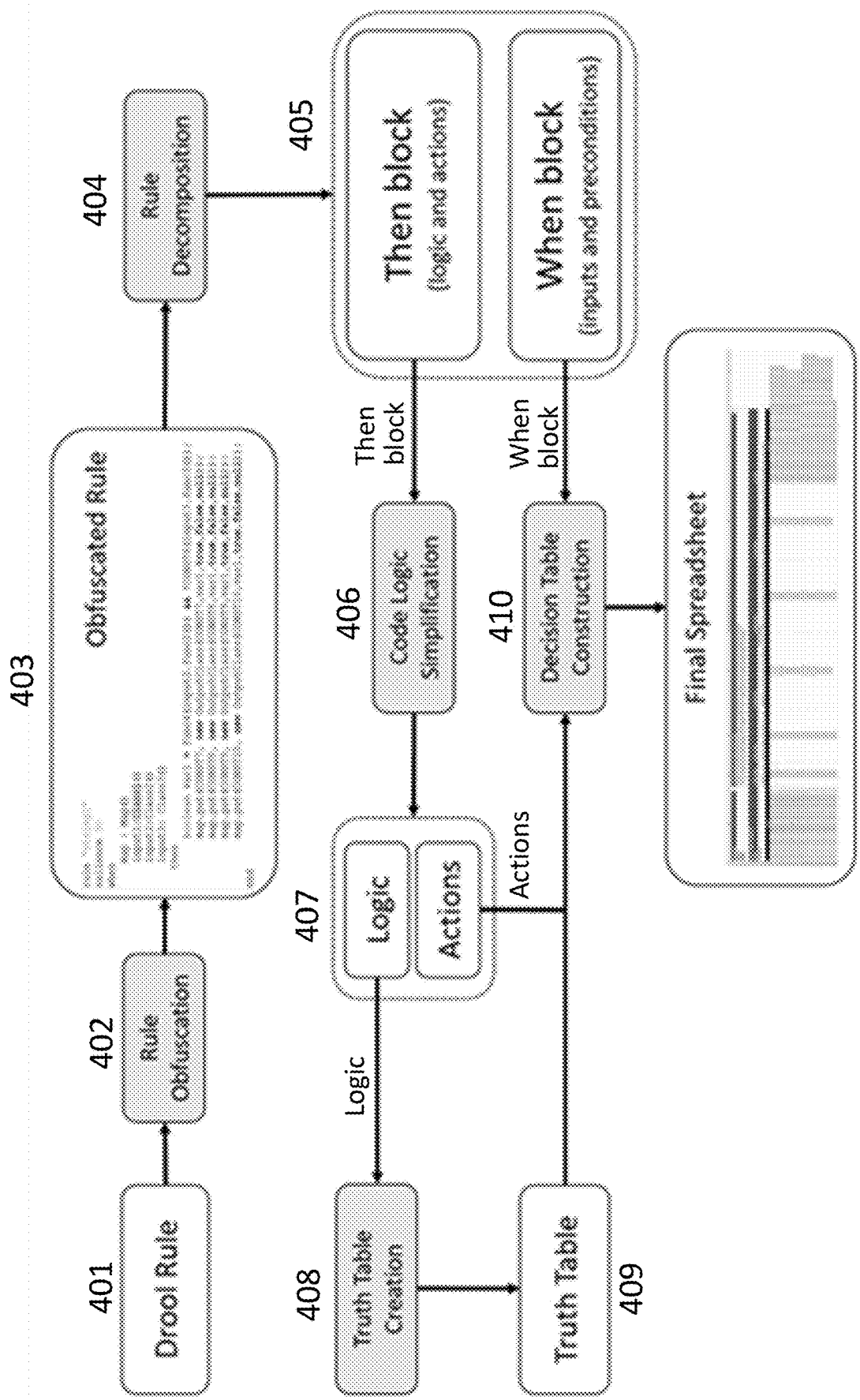
FIG. 4 illustrates a process flow for automatically converting code objects into a human legible output in accordance with an exemplary embodiment.

FIG. 4 illustrates a process flow for automatically converting code objects into a human legible output in accordance with an exemplary embodiment.

According to exemplary aspects, a system which is able to convert Drool rules, or other policy rule software code into more understandable formats, such as spreadsheets, so that policy experts can understand and/or modify policies without having technical knowledge or skill.

According to exemplary aspects, a system for performing a method for automating a process of converting policy rules given as Drool rules or other code format into more human-readable decision tables is provided. The method can be divided into several components: rule decomposition, code obfuscation, code simplification, truth table creation, and decision table construction. These can be visually seen in FIG. 4 and each component is explained in more detail in the subsequent sections.

In operation 401, a Drool rule may be submitted for conversion. According to exemplary aspects, a Drool rule may refer to a business policy rule specified in a software code. The Drool rule may provide a rule definition, which may include, without limitation, a rule name, a condition and consequence. Keywords in the Drool rule may include, for example, when, then and end. In an example, the when part of the Drool rule may refer to a condition, and then part of the Drool rule may refer to a consequence. Although the present disclosure is described with respect to a Drool rule as the software rule code, aspects of the present disclosure are not limited thereto, such that other suitable software codes may be utilized.

In operation 402, rule obfuscation operation may be performed on the submitted Drool rule. According to exemplary aspects, the rule obfuscation operation may include replacing of all functions, variables, libraries, constants and the like with unintelligible or dummy names. In an example, such rule obfuscation operation may be performed using code structure and string search (and replace) algorithms. According to exemplary aspects, at least since rule is obfuscated prior to any subsequent manipulation thereof, data security may be maintained even when utilizing third party programs or vendors, such that possible data leaks may be prevented.

For example, when utilizing a vendor service or an open-source software, data security may not be guaranteed and potential for data leaks may be possible. Accordingly, an organization or user may not utilize such services or software without risking data security. However, by obfuscating sensitive information prior to transmitting the data to a third party vendor device or the open-source software, data security may remain intact. Upon performance of necessary operations at the vendor side or with the open-source software, outputted information may then be reconciled with the masked or replaced sensitive information. Accordingly, by such operations, data may be transformed to retain data security even when external devices or services that may reside outside of an on-premise or private cloud network of the user are utilized to process internal data.

In operation 403, obfuscated rule may be output. According to exemplary aspects, FIG. 5 illustrates an obfuscated rule output in accordance with an exemplary embodiment. As exemplarily illustrated in FIG. 5, specific variables have been replaced with nonce or dummy variables, which hides actual data being processed. In FIG. 5, the rule that was obfuscated is simply named as "string1". Although data structure remains intact, such as functions being called and code operations being executed, actual variables have been renamed with generic identifiers, such as Map ( ), Class1 ( ), Class2 ( ), Class3 ( ), func2, func3, func4, input1, input2, input3, CONST6, CONST7, CONST8, CONST9, CONST 10, var1, new OutputClass and the like.

In operation 404, a rule decomposition operation is performed. According to exemplary aspects, and as illustrated in FIG. 5, a Drool rule may primarily be comprised of two parts, namely, a when block and a then block. The when block may outline arguments, inputs and pre-conditions for the rule. The then block, on the other hand, contains rule logic and actions. The rule decomposition operation may take a full Drool rule, and extract its specific when and then blocks, as well as meta-data information, such as the rule name. According to exemplary aspects, extraneous information that is not part of the when block or the then block may be captured as notes, or otherwise deleted to reduce processing load and for more efficient utilization of computing resources.

According to exemplary aspects, such decomposition of the obfuscated rule may be performed using one or more machine learning (ML) or artificial intelligence (AI) algorithms. In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 405, the decomposed rule are separated for independent processing. More specifically, the then block or part may be processed by operation 406, whereas when block or part may be processed by operation 410 after the rule decomposition.

In operation 406, code logic simplification operation is performed on the then block. According to exemplary aspects, the code simplification may be directed to transforming the then block code into simpler logic steps that may aid in creating a truth table. In an example, the code logic simplification operation may include separating logic and actions in the then block of the code. According to exemplary aspects, one or more ML or AI algorithms may be utilized for performing the code logic simplification. However, aspects of the present disclosure are not limited thereto, such that various parsers, compilers and/or other models may be utilized.

In operation 407, logic and actions are separated and are independently processed from one another. The logic portion of the then block code proceeds to operation 408, whereas the actions portions of the then block code proceeds to operation 410. At least since various parts of the Drool rule code are separates out for independent processing, such as the logic portions, the Drool rule code may be processed more efficiently with less utilization of computing or processor resources. More specifically, at least since extraneous information (e.g., inputs, preconditions, actions and etc.) are not repeatedly processed for select operations (e.g., truth table generation), less CPU resources may be utilized.

Figure 6:
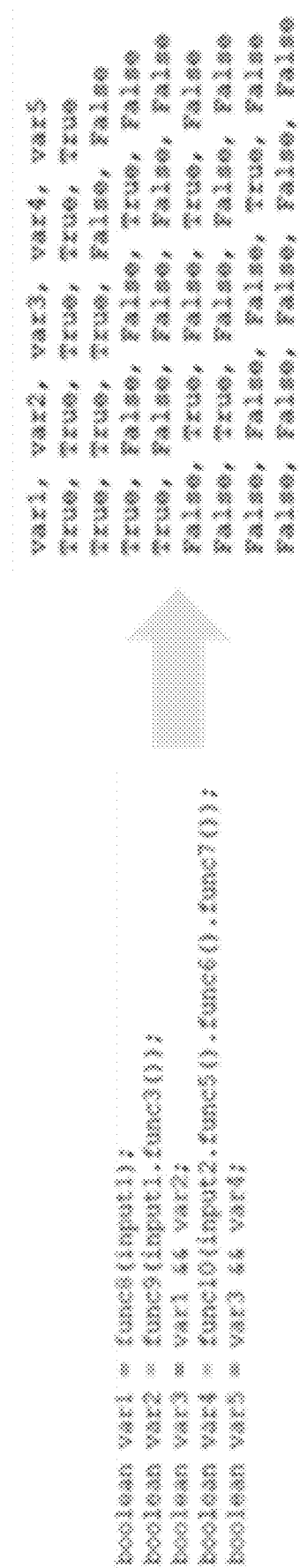
FIG. 6 illustrates a truth table output in accordance with an exemplary embodiment.

In operation 408, a truth table creation operation is performed. According to exemplary aspects, one or more ML or AI algorithms may be utilized for creating the truth table for each of the software rule codes or Drool rules. For example, one or more ML or AI algorithms may be utilized to generate an initial truth table, which may be verified for accuracy of output by a subsequent process. According to exemplary aspects, FIG. 6 illustrates a truth table output in accordance with an exemplary embodiment. As shown in FIG. 6, the truth table provides a true or false value for five variables, namely, var 1, var 2, var 3, var 4 and var 5 for each of the software rule codes as shown on top of the columns on the right side. More specifically, a Boolean value (e.g., true or false) may be determined for each of the five variables, by performing specific functions or operations. For example, a Boolean value for var1 may be determined by executing func8 using an input 1. A Boolean value for other variables may be determined using different functions and/or variables. Although the present disclosure provides utilizing Boolean values, aspects of the present disclosure are not limited thereto, such that other values may be utilized. Further, although five variables are specified in FIG. 6, aspects of the present disclosure are not limited thereto, such that each Drool rule or software rule code may require different number of variables, which may range from 1 to a number larger than 5.

In operation 409, the created truth table may be output and provided to operation 410, where it may be combined with corresponding actions that were separated out in operation 407. For example, a row representing a combination of Boolean values for a software rule code may be combined with a corresponding action.

In operation 410, construction of the decision table is performed. According to exemplary aspects, the above noted truth table may be connected with the inputs and/or preconditions (included in the when block) extracted during the rule decomposition operation, and the actions extracted during the code simplification operation. In an example, the operation of 410 may be performed by connecting mapping metadata to arrive at the final output, such as a spreadsheet. Then the spread sheet is re-populated with the original variable names, such that the spreadsheet or the final output is no longer obfuscated, and may be understandable by policy experts.

In operation 411, the final output or spreadsheet is provided or transmitted to the policy experts for display on a display screen. According to exemplary aspects, FIG. 7 illustrates a natural language output understandable by humans that is generated from a software code object in accordance with an exemplary embodiment.

Figure 7:
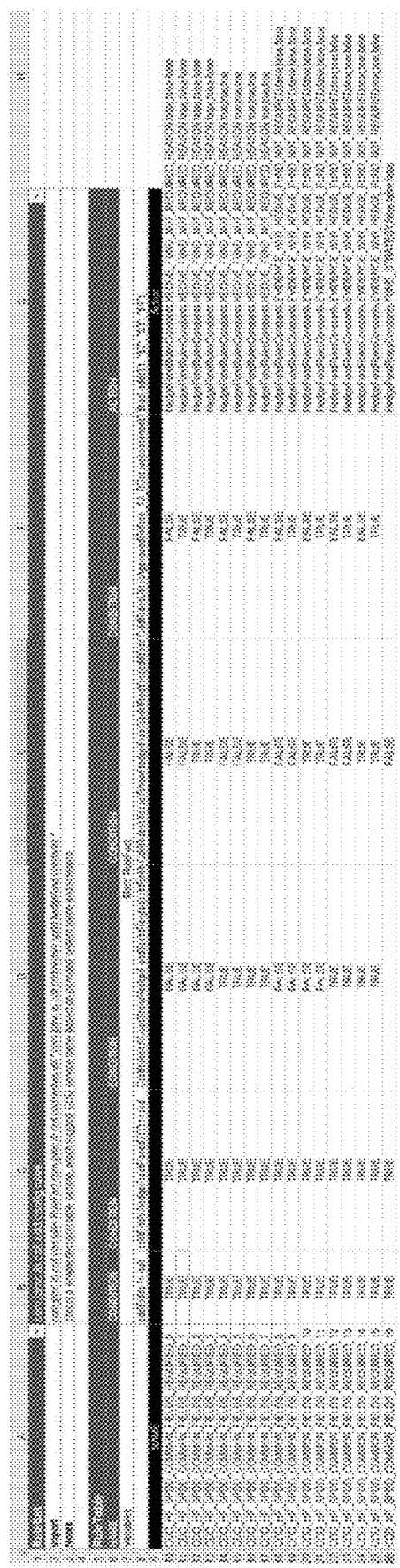
FIG. 7 illustrates a natural language output understandable by humans that is generated from a software code object in accordance with an exemplary embodiment.

As illustrated in FIG. 7, the natural language output may be provided as a spreadsheet. However, aspects of the present disclosure are not limited thereto, such that other formats that may be understandable non-technical professionals may be utilized. Accordingly, even without coding skills or knowledge, a policy professional may be able to discern a combination of conditions that corresponding actions to be performed.

The spreadsheet illustrated in FIG. 7 include names of individual Drool rules under the NAME column. For each of the Drool rules, five conditions are listed as columns. Each of the columns are listed under the CONDITION column, and under each of the CONDITION column, description of the respective condition is provided. Further, for each of the CONDITION column, either a TRUE or FALSE value is provided. For each row of combination of TRUE values and FALSE values, a corresponding action is specified. For example, a Drool rule having a combination of TRUE, TRUE, FALSE, TRUE and FALSE values for the five CONDITION columns may require a corresponding action to be performed. Although five CONDITIONS are specified in FIG. 7, aspects of the present disclosure are not limited thereto, such that each Drool rule may require different number of conditions, which may range from 1 to a number larger than 5.

Moreover, if a particular action specified for a specific combination of condition values no longer applies, a policy expert, who may not have any coding knowledge or skill, may edit the specified action or the specific combination of condition values on the spreadsheet. Such edits by the policy expert may automatically be converted back into a Drool rule utilized by the rule code conversion system.

According to exemplary aspects, upon analysis of the output or spreadsheet by the policy experts, the output or spreadsheet may be modified for correction or to insert a new rule. In an example, modifications may be provided directly on the output or spreadsheet in a similar format as provided in the output or spreadsheet, or in natural language form. The modified spreadsheet or output may then be reverse engineered or processed using one or more ML or AI algorithms to generate a new or modified Drool Rule or other suitable coding format that may be implemented directly into a system. However, aspects of the present disclosure are not limited thereto, such that the modified output or spreadsheet may be converted into other formats, such as Signav io diagrams.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically converting a software rule code specifying a policy rule into a human comprehensible document, the method comprising:
    receiving, by a processor, the software rule code;
    obfuscating, by the processor, the software rule code prior to submission to a machine learning (ML) model;
    decomposing, by the processor, the obfuscated software rule code into at least one then block and at least one when block;
    performing, by the processor, code logic simplification on the at least one then block for separating the at least one then block into at least one logic and at least one action;
    creating, by the processor, a truth table using the at least one logic;
    constructing, by the processor, a decision table by combining the truth table, the at least one when block and the at least one action; and
    outputting, by the processor, the human comprehensible document for display on a display screen.

2. The method according to claim 1, wherein the human comprehensible document is a spreadsheet.

3. The method according to claim 1, wherein the software rule code is a Drool rule.

4. The method according to claim 1, wherein the ML model is provided by a third party and resides outside of a cloud network.

5. The method according to claim 1, wherein the ML model is open-source.

6. The method according to claim 1, wherein the code logic simplification is performed using another ML model.

7. The method according to claim 1, wherein the when block includes an input and a precondition.

8. The method according to claim 1, wherein the truth table includes a plurality of combinations of condition values corresponding to the at least one logic.

9. The method according to claim 8, wherein the truth table lists names of each of the plurality of variables along its columns, and each row of the truth table includes either a true or false value for each of the plurality of variables.

10. The method according to claim 8, wherein each of the plurality of combinations of condition values corresponds to a specific action that is to be performed.

11. The method according to claim 8, wherein each of the plurality of combination of condition values corresponds to a specific action, and the specific action is combined with a respective combination of condition values during the constructing of the decision table.

12. The method according to claim 1, wherein the software rule code includes a rule name, at least one condition and at least one consequence.

13. The method according to claim 12, wherein the obfuscation of the software rule code includes replacing the rule name with a generic descriptor.

14. The method according to claim 12, wherein the obfuscation of the software rule code includes replacing the at least one condition with a generic descriptor.

15. The method according to claim 12, wherein the obfuscation of the software rule code includes replacing the at least one consequence with a generic descriptor.

16. The method according to claim 12, wherein the obfuscation of the software rule code includes replacing each of the rule name, the at least one condition and the at least one consequence with generic descriptors.

17. The method according to claim 16, wherein the constructing of the decision table includes replacing the generic descriptors with the rule name, the at least one condition and the at least one consequence.

18. The method according to claim 1, wherein the human comprehensible document is editable and convertible to a modified or new software rule code executable by the processor.

19. A system to provide for automatically converting a software rule code specifying a policy rule into a human comprehensible document, the system comprising:
    at least one memory;
    at least one processor; and
    a display screen,
    wherein the system is configured to perform:
    receiving the software rule code;
    obfuscating the software rule code prior to submission to a machine learning (ML) model;
    decomposing the obfuscated software rule code into at least one then block and at least one when block;
    performing code logic simplification on the at least one then block for separating the at least one then block into at least one logic and at least one action;
    creating a truth table using the at least one logic;
    constructing a decision table by combining the truth table, the at least one when block and the at least one action; and
    outputting the human comprehensible document for display on the display screen.

20. A non-transitory computer readable storage medium that stores a computer program for automatically converting a software rule code specifying a policy rule into a human comprehensible document, the computer program, when executed by a processor, causing a system to perform a plurality of processes comprising:
    receiving the software rule code;
    obfuscating the software rule code prior to submission to a machine learning (ML) model;
    decomposing the obfuscated software rule code into at least one then block and at least one when block;
    performing code logic simplification on the at least one then block for separating the at least one then block into at least one logic and at least one action;
    creating a truth table using the at least one logic;
    constructing a decision table by combining the truth table, the at least one when block and the at least one action; and
    outputting the human comprehensible document for display on a display screen.

* * * * *